United States Patent [19]
Runte et al.

[11] 4,015,846
[45] Apr. 5, 1977

[54] HANDICAPPING CIRCUIT FOR ELECTRONIC GAMES

[75] Inventors: Robert Ralph Runte, Palatine; Theodore A. Mau, Chicago, both of Ill.

[73] Assignee: Robert Ralph Runte, Palatine, Ill.

[22] Filed: Apr. 30, 1976

[21] Appl. No.: 681,845

[52] U.S. Cl. .................. 273/85 R; 273/DIG. 28; 340/324 AD

[51] Int. Cl.² .......................................... A63F 9/00

[58] Field of Search ............. 178/6.8; 235/92 TA, 235/92 TS, 92 GA, 193; 273/1 E, 1 ES, 85 R, 101.2, 102.2 R, 102.2 B, DIG. 28; 340/323 R, 324 A, 324 AD, 172.5

[56] References Cited
UNITED STATES PATENTS

| | | | |
|---|---|---|---|
| 3,631,457 | 12/1971 | Hamada et al. | 340/172.5 |
| 3,659,284 | 4/1972 | Rausch | 273/85 R |
| 3,659,285 | 4/1972 | Baer | 273/85 R |
| 3,793,483 | 2/1974 | Bushnell | 340/324 AD |

*Primary Examiner*—Richard C. Pinkham
*Assistant Examiner*—Vance Y. Hum
*Attorney, Agent, or Firm*—Anthony S. Zummer

[57] ABSTRACT

A handicapping circuit for handicapping electronic visual games is disclosed herein. The handicapping circuit includes a plurality of input NAND gates, connected to a pair of counters. Each counter of the pair is connected to a logic gate. Each of the logic gates is connected to other portions of the game circuit. A first counter of said pair is incremented upon a first player's leading score differential. A second counter of the pair is incremented upon a second player's leading score. The logic gates are activated when either of their respective counters reaches a count of four or eight. The count of four or eight at either counter indicates that one of the players is leading the other player by four points or eight points. The signal received from the NOR gate is channeled to other portions of the game circuit, which increase the size of a paddle image controlled by whichever player is trailing.

19 Claims, 2 Drawing Figures

HANDICAPPING CIRCUIT FOR ELECTRONIC GAMES

BACKGROUND OF THE INVENTION

Manual play electronic visual games are well-known in the art. Representative disclosures of typical electronic visual games, and associated display circuitry, can be found in U.S. Pat. Nos. 3,631,457 to Hamada, et al.; 3,659,284 to Rusch; 3,659,285 to Baer, et al.; and 3,793,483 to Bushnell. The typical manual play electronic visual game is of the hockey or Ping-Pong variety. The game is adapted to be played by a pair of players. Each player has a control unit, which he can use to control a cursor or paddle image, which is movable on a television or cathode ray screen. The cursor usually can be controlled in a single direction of movement only (for instance, up and down). The game circuitry also generates a puck or ball image, commonly a small square, which moves across the screen or "playing field". The circuitry which controls the ball calculates angles of incidence and reflection to duplicate as closely as possible conditions under which an actual hockey game might be played. The players are able to move their paddles along a single direction in order to deflect the moving square back into the other player's field of play. Normally, if the moving square and the cursor of a particular player do not intersect, the moving square moves behind the cursor; and a point is scored in favor of the opposite player. Thus, games similar to tennis, Ping-Pong or volleyball can be played.

Other more complicated games involve games somewhat similar to hockey in that they involve making a shot in a particular specified goal area in order to accrue points. In these types of games, each of the players commonly controls a forward cursor and a number of rear cursors, which can act as blocking cursors. However, the basic principles of the game remain the same.

The prior art games, however, do not provide a means by which a pair of players who are playing at different levels of skill can have an interesting, competitive game. In other words, the player who is of superior skill will, in the ordinary course of events, win a greater number of games than the player of lesser skill. Of course, both the player of superior skill and the player of lesser skill will soon tire of the game since neither will be able to find competitors who will given them a good game at their level of skill.

What is needed, then, is a device which will allow a handicap to be automatically placed on a particular game. The handicap should only be engaged, however, when there is a certain size score differential between the players. The handicap should also be removed from the player when the score differential of the players, having once been large, returns to a smaller preselected value.

SUMMARY OF THE INVENTION

A handicapping circuit for use with electronic visual games is herein disclosed. The handicapping circuit includes a pair of tandem NAND gates, which receive input signals from a clock whenever a point is scored by either of a pair of players. For purposes of discussion, one player is defined as the "left" player; and the other player is defined as the "right" player. The NAND gates for the right player are connected to a right counter. The NAND gates for the left player are connected to a left counter. A pair of right NOR gates is connected to a plurality of selected output terminals of the right counter. A left NOR gate and a left OR gate are connected to a plurality of selected terminals of the left counter. The NOR gates are connected to output leads. Thus, there are a plurality of output leads for the right-hand NOR gates, and a plurality of output leads for the left-hand NOR gates. The output leads for the right-hand NOR gate, and for the left-hand NOR gates, are both connected to other portions of the game circuit.

In use, when the right player makes a point in a game such as hockey, tennis or Ping-Pong, a clock pulse is inputted into one of the NAND gates, which is connected to the right-hand counter. The NAND gate is enabled; and causes the right counter to increment by one step. In a similar fashion, when, at the beginning of a game, the left player scores, the left counter is incremented. When either the right counter or the left counter reaches a selected score differential between the players, they supply a signal to either the right NOR gates or left OR gate and NOR gates, respectively. The NOR gates and the OR gate then supply a signal to other portions of the game control circuitry.

The signal supplied to other portions of the game control circuitry commonly causes a paddle image, generated by a paddle generator, of the losing player to expand in height. Thus, when the paddle of the losing player expands in size, it makes it somewhat easier for the losing player to intercept a moving image of a ball or a square, which is the object of the game.

When the score differential drops back to a predetermined level, that is, when the player who is behind is catching up with the leading player, the counter for the player who is behind will stop producing a signal; and thus cause the enlarged paddle to return to its customary size, thereby removing the handicap from other portions of the game circuit.

A principal object of the present invention is to provide a handicapping circuit for visual electronic games, which provides control signals to other portions of the visual electronic games for a selected score differential.

Another object of the present invention is to provide an electronic handicapping circuit for visual electronic games, which is adapted to automatically reset when the score differential for a game drops below a preselected level.

Another object of the instant invention is to provide an electronic handicapping circuit which is inexpensive to manufacture and may be easily installed in existing circuits with a minimum of change in the existing circuit.

DESCRIPTION OF THE PREFERRED EMBODIMENT

Figure 1:
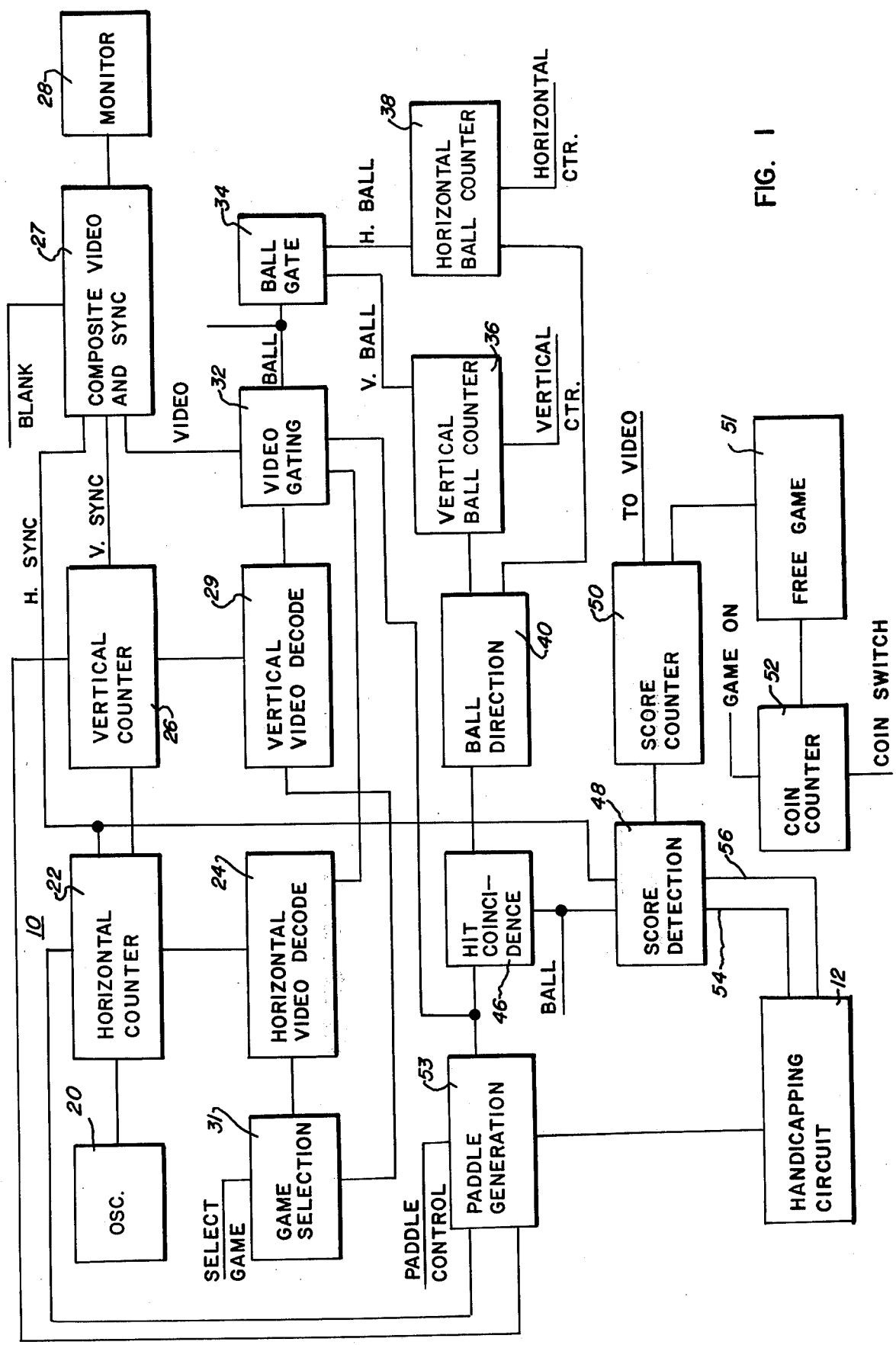
FIG. 1 is a block diagram of an electronic visual game, showing the interconnection between the electronic visual game and an inventive handicapping circuit.

Referring now to the drawings, and especially to FIG. 1, a block diagram of an electronic visual game, generally indicated by numeral 10, is shown therein. A block diagram is employed in FIG. 1 because the physical construction of electronic visual games is well-known. Electronic visual game 10 includes, among its subsystems, a handicap circuit 12. Handicap circuit 12 has an input gating system 14, which is also a means for receiving a signal of a scoring event. A counter circuit 16 is connected to the input gating system 14. Counter circuit 16 is also a means for selectively storing a signal of a score. An output gating circuit 18 is connected to counter circuit 16. Output gating circuit 18 is also a means for providing an output indication for a predetermined score differential.

Electronic visual game 10 is conventional, except for the handicapping circuit 12. A local oscillator 20 is connected to a horizontal counter 22. Horizontal counter 22 is connected to a horizontal video decoder 24, a vertical counter 26, and a composite video and sync system 27. Composite video and sync system 27 is connected to a standard television monitor 28. Vertical counter 26 is connected to a vertical video decoder 29. Horizontal video decoder 24 is connected to a game selection circuit 31. Game selection circuit 31 and horizontal video decoder 24, and composite video and sync system 27, are all connected to a video gating circuit 32. Video gating circuit 32, in turn, is connected to the composite video and synchronizing circuit 27.

A ball gate 34 is connected to video gating circuit 32. A vertical ball counter is connected between the vertical counter 26 and ball gate 34. A horizontal ball counter 38 is connected between horizontal counter 22 and ball gate 34. A ball direction circuit 40 is connected to both vertical ball counter 36 and horizontal ball counter 38. The ball direction circuit 40 is connected to a hit coincidence circuit 46. Hit coincidence circuit 46 is, in turn, connected between ball gate 34 and video gating circuit 32; and is also connected to a score detection circuit 48.

Score detection circuit 48 is connected to a score counter display 50. Score counter display 50 is connected to the video line between the video gating circuit 32 and the composite video and synchronizing display circuit 28. A free game circuit 51 is connected to score counter 50. A coin counter 52 is connected to free game circuit 51. A paddle generator 53 is connected to the hit coincidence circuit 46. Paddle generator 53 is connected to horizontal counter 22 and vertical counter 26. Paddle generator 53 is also connected to handicap circuit 12. In addition, handicap circuit 12 is connected to score detection circuit 48.

Figure 2:
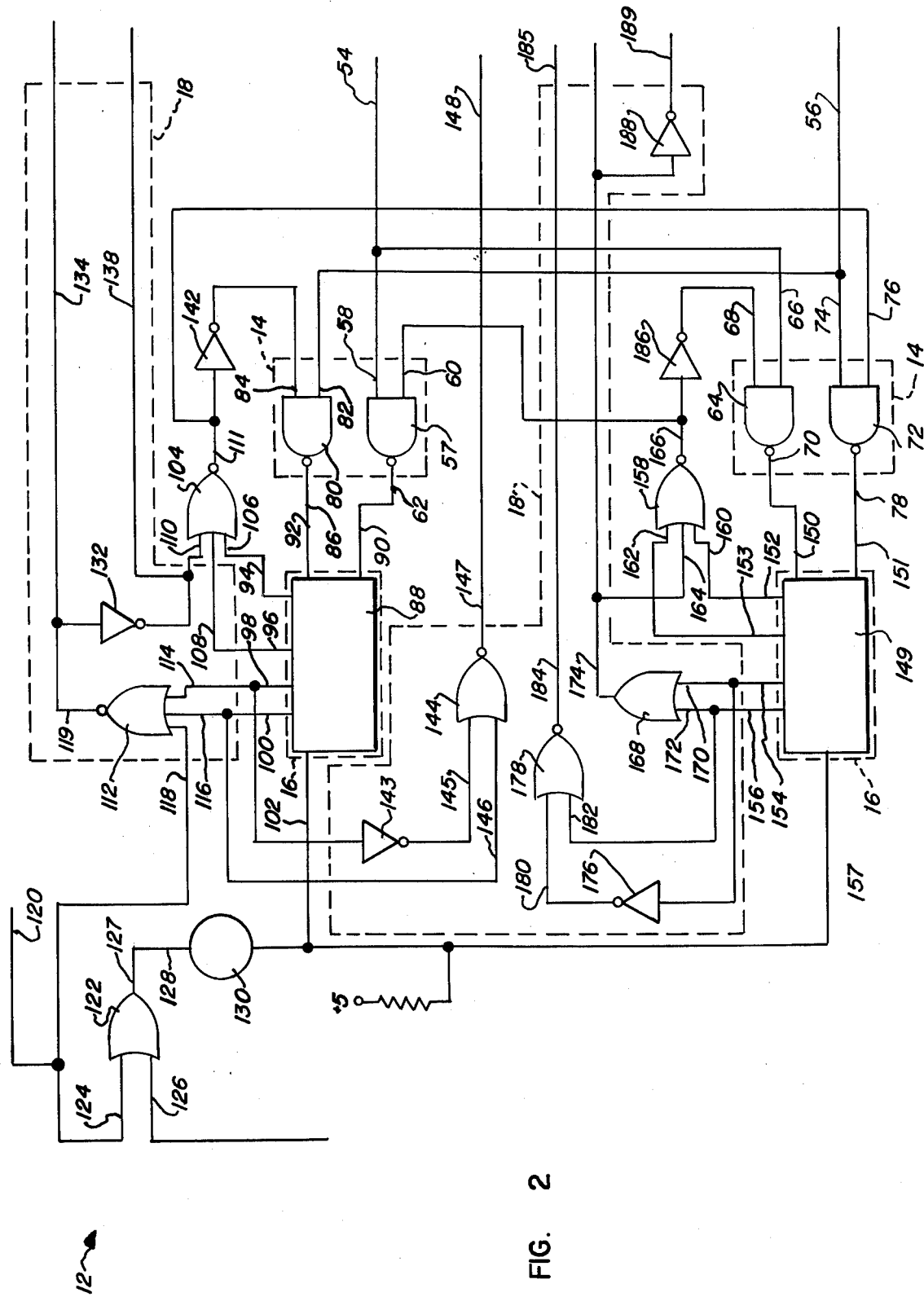
FIG. 2 is a schematic diagram of the handicapping circuit of FIG. 1.

Referring now to FIG. 2 of handicapping circuit 12, input gating system 14 includes a pair of leads 54 and 56, which is connected between score detection circuit 48 and handicapping circuit 12. Lead 54 is connected to a right NAND gate 57 at an input terminal 58. NAND gate 57 has an input terminal 60 and an output terminal 62. Lead 54 is also connected to a left NAND gate 64 at an input terminal 66. NAND gate 64 also includes a second input terminal 68 and an output terminal 70.

Lead 56 is connected to a left NAND gate 72 at an input terminal 74. NAND gate 72 also has a second input terminal 76 and an output terminal 78. Lead 56 is also connected to a right NAND gate 80 at an input terminal 82. NAND gate 80 also includes an input terminal 84 and an output terminal 86. Lead 54 carries score signals from a right player. Lead 56 carries score signals from a left player.

NAND gates 57 and 80 are connected, via output terminals 62 and 86, respectively, to counter circuit 16 and to an up-down counter 88. Output terminal 62 of NAND gate 57 is connected to an up terminal 90 of counter 88. Lead 86 of NAND gate 80 is connected to a down terminal 92 of counter 88. Counter 88 also includes a plurality of output terminals, respectively numbered 94, 96, 98 and 100. Counter 88 also has a clear terminal 102.

Output gating circuit 18 includes a NOR gate 104, which is connected at a pair of input terminals 106 and 108 to terminals 94 and 96 of counter 88. NOR gate 104 has another input terminal 110 and an output terminal 111. Output terminals 98 and 100 of counter 88 are connected to a NOR gate 112 at a pair of respective input terminals 114 and 116. NOR gate 112 has another input terminal 118 and an output terminal 119. NOR gate 112 is connected to a house control 120 and an OR gate 122. Terminal 118 is connected to OR gate 122 at an input terminal 124. OR gate 122 also has another input terminal 126 and an output terminal 127. An output lead 128 is connected to OR gate 122 at output terminal 127. A handicapping switch 130 is connected to lead 128. Switch 130 is, in turn, connected to clear terminal 102 of counter 88. Output terminal 119 of NOR gate 112 is connected to an inverter 132. Output terminal 119 is also connected to an output line 134. Inverter 132 is connected to an output line 138 and to input terminal 110 of NOR gate 104. Output terminal 111 is connected to input terminal 76 of NAND gate 72. Output terminal 111 is also connected to an inverter 142. Inverter 142 is connected to input terminal 84 of NAND gate 80.

An inverter 143 is connected to terminal 98 of counter 88. A NOR gate 144, having a pair of input terminals respectively numbered 145 and 146, is connected to inverter 143 at input terminal 145. Input terminal 146 is connected to output terminal 100 of counter 88. NOR gate 144 also has an output terminal 147 which is connected to a line 148.

Lines 134, 138 and 148 are connected to paddle generator 52.

In a similar fashion, a counter 149 is connected at a pair of input terminals 150 and 151 to terminals 70 and 78, respectively, of NAND gates 64 and 72. Counter 149 has a plurality of output terminals respectively numbered 152, 153, 154 and 156, and has a clear terminal 157. Output terminals 152 and 153 are connected to a NOR gate 158 at a pair of input terminals respectively numbered, 160 and 162. NOR gate 158 also has an input terminal 164 and an output terminal 166. Output terminals 154 and 156 are connected to an OR gate 168 at a pair of respective input terminals 170 and 172. OR gate 168 has an output terminal 174. Output terminal 154 of counter 149 is also connected to an inverter 176. Inverter 176 is connected to a NOR gate 178 at an input terminal 180. NOR gate 178 has another input terminal 182 connected to terminal 156 and an output terminal 184. Output terminal 184 is connected to a lead 185.

An inverter 186 is connected between output terminal 166 of NOR gate 158 and input terminal 68 of NAND gate 64. An inverter 188 is connected to output line 174 of NOR gate 168. A lead 189 is connected to inverter 188. Leads 174, 185 and 189 are connected to paddle generator 52.

In operation, oscillator 20 drives horizontal video decode circuit 24. Also, at intervals of 63.5 microseconds, horizontal counter 22 generates a sync pulse which is delivered to composite video and sync circuit 27. Horizontal video decode circuit 24 in turn, sends a signal to video gating circuit 32. Horizontal counter 22 also has a periodic output which drives vertical counter 26. Vertical counter 26 provides vertical synchronization to the composite video and synchronizer circuit 27. Vertical decoder 29 also receives a decoded count at periodic intervals from the vertical counter 26. Since the vertical counter is driven by counting signals of integral multiples supplied by the horizontal counter, the vertical counter runs at a much slower rate. The vertical video decode circuit 29 in turn supplies a signal to video gating circuit 32. Horizontal counter 22 and vertical counter 26 in turn drive horizontal ball counter 38, vertical ball counter 36, and paddle generator 52, respectively.

Horizontal ball counter 38 and vertical ball counter 36 control a ball gate 34. Output from ball gate 34 is fed into video gating circuit 32. Video gating circuit 32 thus receives a ball image signal from ball gate 34. In addition, horizontal and vertical ball counters 38 and 36 supply respective signals to a ball direction circuit 40. Ball direction circuit 40 supplies a signal to hit coincidence circuit 46 indicative of the position of a ball image.

Paddle generator 53 also supplies a signal to hit coincidence circuit 46. When the position of a paddle generated by paddle generator 53 and the ball generated by ball direction circuit 40 coincides, hit coincidence circuit 46 generates a signal which is fed into the video gating circuit 32. If there is no hit coincidence for a ball movement across the screen, hit coincidence circuit 46 supplies a signal to score detection circuit 48. Score detection circuit 48 in turn, determines whether a first or left player, or a second or right player, missed striking the ball image and supplies a signal accordingly to score counter 50. Score counter 50 supplies a signal to the composite video and sync circuit 27. Score counter 50 generates an image of the score at that time between the two players. Score counter 50 supplies a score count to free game circuit 51 which allows a free game for preselected score differentials at the close of a particular game.

Score detection circuit 48 has leads 54 and 56 connected to it. Leads 54 and 56 are in turn connected to handicap counter 12. Whenever the right player scores a point, a pulse is supplied to lead 54. Whenever the left player scores a point, a pulse is supplied to lead 56.

Referring now to the specific operation of handicapping circuit 12, at the beginning of a game, the handicap switch 130 is closed and a zero game on pulse is received at OR gate 122 at terminal 126. OR gate 122 then supplies a one pulse through handicap switch 130 to clear terminals 102 and 157 of counters 88 and 149, respectively. Thus, counters 88 and 149 are zeroed. NOR gate 112 produces a 1 at line 134. Inverter 132 produces a 0 at line 138. NOR gate 104 generates a 1 at input terminal 76 of NAND gate 72 and at inverter 142. Inverter 142 produces a 0 at terminal 84 of NAND gate 80. Thus, NAND gate 72 is enabled and NAND gate 80 is disabled. NOR gate 144 produces a 0 at line 148. Similarly, lines 174 and 185 are held at 0 and inverter 186 produces a 1. NAND gate 57 is enabled and NAND gate 64 is disabled.

After play of the game has begun, the right player for instance, may score the first point. When the right player scores the first point, a pulse is supplied through line 54 to input terminal 58 of NAND gate 57, as terminal 60 is held at 1 initially. The trailing edge of the pulse received at input terminal 58 causes NAND gate 57 to supply a pulse to up terminal 80 of counter 88. Counter 88 is thus incremented by 1.

Counter 88 has a binary output; that is, a 1 at terminal 94 represents 1, a 1 at terminal 96 represents 2, a 1 at terminal 98 represents 4 and a 1 at terminal 100 represents 8. Therefore, after receiving the first score, terminal 94 goes high and represents 1 and also has a digital 1 thereon. When terminal 94 goes high, terminal 106 of NOR gate 104 also goes high, and generates a binary 0 at output 111. Thus, a binary 0 is supplied to inverter 142 and at input terminal 76 of NAND gate 72. Inverter 142 converts the 0 it receives to a 1 and holds input terminal 84 of NAND gate 80 at 1. Thus, NAND gate 80 is effectively enabled by the 1 at lead 84. Also, NAND gate 72 is disabled by the 0 impressed at lead 76. Thus, counter 88 can count up or down and counter 144 is completely disabled.

In a similar fashion, if additional right score pulses are received from line 54, indicating that the right player is scoring, NAND gate 57 will output pulses to up terminal 90 of counter 88 and cause counter 88 to be incremented. When counter 88 reaches a count of 4 or more, a positive going signal is produced at lead 98. This positive going signal causes NOR gate 112 to produce a 0 at output terminal 119 and lead 134. The 0 is converted to a 1 by inverter 134, and the 1 is fed into input terminal 110 of NOR gate 104. Thus, whenever any score is present on counter 88, NOR gate 104 produces a 0 output which, in turn, is converted to a 1 by inverter 142 and holds lead 84 at 1, thus keeping NAND gate 80 enabled.

Similarly, when the score counted by counter 88 reaches 8 or more, a 1 is supplied to terminal 116 of NOR gate 112. NOR gate 112 then continues to supply a 0 to lead 134 and inverter 132 supplies a 1 to lead 138.

When the score is 4 or more, but less than 8, terminal 98 has a positive voltage impressed thereon, which in turn, impresses a 1 on inverter 143, which inverter 143 converts to a 0. The 0 is then impressed at terminal 145 of NOR gate 144. At the same time, when the score is only 4, terminal 100 of counter 88 is producing a 0 and another 0 is impressed at terminal 146 of NOR gate 144. Thus, when both 0's are impressed on NOR gate 144, NOR gate 144 produces a 1 which indicates that the score differential is 4 or more. A 1 at line 148, with a 0 at line 134 and a 1 at line 138, causes the paddle generator 53 to double the height of the left player's paddle image. Similarly, a 1 at line 134, a 0 at line 138 and a 1 at line 148, causes paddle generator 53 to increase the height of the paddle image by 50%.

If, after several points have been scored by the right player, the left player scores a point, a positive going pulse is supplied through lead 56 to terminal 74 of NAND gate 72. However, lead 76 is being held at 0 and, therefore, NAND gate 72 has been disabled. At the same time, the pulse is supplied from lead 56 to input terminal 82 of NAND gate 80. NAND gate 80 is being held in an open condition by the binary 1 supplied to lead 84 from inverter 142. A pulse is thus supplied by NAND gate 80 to down terminal 92 of counter 88, thus backing the count of counter 88 down. The count in counter 88 will thus be backed off until the left player's score is equal to the right player's score. Once the count drops below 4, line 134 returns to the 1 state, line 138 returns to the 0 state and line 148 returns to the 0 state thereby causing paddle generator 52 to produce a regular size paddle image.

If the left player continues to score, and his score becomes greater than the right player's score, lead 76 is returned to the 1 state and the successive scores can increment counter 149. Once a count has been placed on counter 149, one or more of the input terminals to NOR gate 158 will be held at 1, thus holding the output from NOR gate 158 at 0. This 0 output is transmitted to input terminal 60 of NAND gate 56, thereby disabling NAND gate 57. In addition, NAND gate 64 is enabled by a 1 signal received from inverter 186. When the score at counter 149 reaches 4, a 1 pulse is supplied from terminal 154 to terminal 170 of OR gate 168. OR gate 168 then produces a binary decoded 1 at lead 174. This 1 is transmitted outside of the handicapping circuit. In addition, a 1 is transmitted to inverter 176 which converts the 1 to a 0 and supplies a 0 to lead 180 of NOR gate 178. Since the score is 4 and is less than 8, the terminal 156 of counter 149 is held at 0, thus supplying 0's at input leads 180 and 182 of NOR gate 178. NOR gate 178 then outputs a 1 which indicates that the score differential is 4 or greater, but less than 8.

When the score differential becomes 8 or greater, a 1 will be supplied to NOR gate input terminal 182 of NOR gate 178, thereby switching lead 184 to 0, or allowing lead 174 to remain at 1. An inverter 188 is also connected to lead 174 to supply a 0 state when the score differential is greater than 4. When the state of lead 185 is 1, paddle generator 53 increases the width of the left player's paddle by 50%. When the signal at lead 185 is 0 or 1, and the signals at leads 134 and 138 are respectively 0 and 1, paddle generator 53 increases the size of the left player's paddle 100% greater than it normally is. When the output at lead 185 is 1, paddle generator 53 increases the size of the right player's paddle by 50%. When the output of line 185 is 0, and the output of line 174 is 1, the paddle generator increases the size of the left player's paddle by 100%. When the left score begins dropping, and lead 185 returns to its 1 state, the left paddle will be reduced to only 50% greater than its original size, and when the signal at lead 185 is 0 and the signal at lead 174 is 0, the left paddle returns to its original size. The right paddle returns to its original size when the right player's score differential shrinks in a similar fashion.

Thus, handicapping circuit 12 operates to detect differences between the left player's score and the right player's score. After the score difference has been detected, a signal is supplied indicating whether the right player's score differential is 4 or greater and less than 8, or 8 or greater, and whether the left player's score differential is 4 or greater, but less than 8, or 8 and greater. If one of the opposing party's scores is 4 or greater, but less than 8, his opponent's paddle is increased in size. If the score is 8 or greater, his opponent's paddle is increased in size again. Thus, the handicapping circuit generates a handicapping signal for selective score differentials. The handicapping signal is fed to other portions of the circuit, in this case, to the paddle area.

The handicapping circuit allows players of unequal skill to play an interesting game which has an automatic handicapping feature. The automatic handicapping feature is only engaged for selective score differentials and is disengaged when a particular score differential drops back below a preselected level.

Although a specific embodiment of the instant invention has been described in detail above, various modifications and changes in the instant invention will be obvious to one skilled in the art. It is to be expressly understood that the instant invention is limited in scope only by the appended claims.

What is claimed is:

1. An electronic handicapping circuit for use with an electronic visual game comprising: means for generating a movable video image; means for providing scoring event signals; means for receiving said signal of said scoring event; means for selectively storing said signal of said scoring event connected to said means for receiving said score signal; means for providing a predetermined score differential and means for providing an output indication for said predetermined score differential connected to said means for selectively storing said signal of said scoring event, said means for providing said output indication of said predetermined score differential being adapted to provide a control signal, said control signal being adapted to regulate a movable video image generated by said electronic visual game.

2. An electronic handicapping circuit for use with an electronic visual game as defined in claim 1, in which said means for receiving said signal of said scoring event includes first means for receiving a score signal from a first player and second means for receiving a score signal from a second player.

3. An electronic handicapping circuit for use with an electronic visual game as defined in claim 2, in which the first means for receiving the score signal from the first player includes a pair of logic gates and the second means for receiving the score signal from the second player includes a second pair of logic gates.

4. An electronic handicapping circuit for use with an electronic visual game as defined in claim 3, in which said logic gates each include a NAND gate, said NAND gates being adapted to be selectively enabled or disabled, depending upon the condition of the means for selectively storing the signal of the scoring event.

5. An electronic handicapping circuit for use with an electronic visual game as defined in claim 1, in which the means for selectively storing said signal of said scoring event includes a counter adapted to store a score differential when a first player is leading a second player.

6. An electronic handicapping circuit for use with an electronic visual game as defined in claim 5, in which said means for selectively storing said signal of said scoring event includes a second counter, said second counter being adapted to store a score differential when said second player is leading said first player.

7. An electronic handicapping circuit for use with an electronic visual game as defined in claim 6, in which said first counter and said second counter each have a respective up-count terminal and a respective down-count terminal, said up-count terminals being adapted to add to said stored score signal and said down-count terminals being adapted to subtract from said stored score signal.

8. An electronic handicapping circuit for use with an electronic visual game as defined in claim 1, in which said means for providing an output indication for a predetermined score differential includes a logic gate connected to said means for storing said signal of said scoring event.

9. An electronic handicapping circuit for use with an electronic visual game as defined in claim 1, in which the means for providing an output indication for a predetermined score differential includes a first NOR gate, said first NOR gate being adapted to provide an output indication when a first player is leading by a predetermined score differential; and a second NOR gate, said second NOR gate being adapted to provide an output indication when said second player is leading by a predetermined score differential.

10. An electronic handicapping circuit for use with an electronic visual game as defined in claim 1, in which said means for receiving a signal of a scoring event includes a first pair of NAND gates and a second pair of NAND gates, one of said first pair of NAND gates and one of said second pair of NAND gates being connected to receive a score impulse from a first player's score, the other of said first pair of NAND gates and the other of said second pair of NAND gates being adapted to receive a score impulse from a second player's score.

11. An electronic handicapping circuit for use with an electronic visual game as defined in claim 10, in which said means for storing said signal of said scoring event includes a first counter, said first counter having an up gate and a down gate, said up gate of said first counter being connected to one of said NAND gates of said first pair and said down gate of said first counter being connected to said other of said NAND gates of said first pair; and a second counter, said second counter having an up terminal and a down terminal, said second counter up terminal being connected to one of said second pair of NAND gates and said second counter down terminal being connected to another of said NAND gates of said second pair, said first counter being adapted to have its count increased upon an increasing first player score differential and said first counter being adapted to have its count decreased upon a decreasing first player score differential, said second counter being adapted to have its count increased upon an increasing second player score differential and said second counter being adapted to have its count decreased upon a decreasing second player score differential.

12. An electronic handicapping circuit for use with an electronic visual game as defined in claim 11, in which said first counter has a NOR gate connected to a plurality of output leads, said NOR gate being adapted to provide an output indication upon a preselected score differential; and a second NOR gate, connected to said second counter, said second NOR gate being adapted to provide an output indication upon a preselected count being reached by said second counter.

13. An electronic handicapping circuit for use with an electronic visual game as defined in claim 11, in which said first counter has a first plurality of output leads, said first plurality of output leads being connected to one of said first pair of NAND gates and one of said second pair of NAND gates, said output terminals being adapted to enable said down terminal of said first counter when said first counter has a stored count of more than zero and said output terminals being adapted to disable said up terminal of said second counter when said first counter has a stored count of more than zero.

14. An electronic handicapping circuit for use with an electronic visual game comprising: means for generating a movable video image; means for generating a score signal; a plurality of input logic gates for receiving said score signal; a counter connected to said plurality of input logic gates, said counter being adapted to be incremented selectively by said score signal; means to provide a preselected score differential; and a plurality of output logic gates, connected to an output of said counter, said plurality of output logic gates being adapted to provide an output signal when said counter indicates a preselected score differential, said output signal from said plurality of output logic gates being adapted to alter playing dimensions of said movable video image.

15. An electronic handicapping circuit for use with an electronic visual game as defined in claim 14, in which said plurality of input logic gates includes a first pair of input NAND gates and a second pair of input NAND gates.

16. An electronic handicapping circuit for use with an electronic visual game as defined in claim 14, in which said counter includes a first score differential counter and a second score differential counter, said first score differential counter being adapted to count and store a first score differential when a first player is leading and said second score differential counter being adapted to count and score a second score differential when a second player is leading.

17. An electronic handicapping circuit for use with an electronic visual game as defined in claim 14, in which said plurality of output logic gates includes a first NOR gate and a second NOR gate, a third NOR gate and an OR gate connected to said counter, said first and second NOR gates being adapted to provide output signals upon a predetermined score differential when a first player is leading, said third NOR gate and said OR gate being adapted to provide an output indication when said score differential reaches a predetermined level and a second player is leading.

18. An electronic handicapping circuit for use with an electronic visual game as defined in claim 14, including a handicapping switch connected to said counters, said handicapping switch being adapted to clear said counters for a new game.

19. In an electronic visual game, including means for displaying a pair of player controllable paddle images, and means for displaying an automatically moving ball image; the improvement comprising: an electronic handicapping circuit, said electronic handicapping circuit having means for counting and storing a score differential between a pair of players, means for controlling the playing parameters of a movable video image of said paddles and said ball when said score differential exceeds a preselected level, and means for establishing said score differential and said preselected level.

* * * * *